Feb. 8, 1955  J. W. RUNDT  2,701,637
ARTICLE ORIENTING MACHINE
Filed Nov. 16, 1949  2 Sheets-Sheet 1

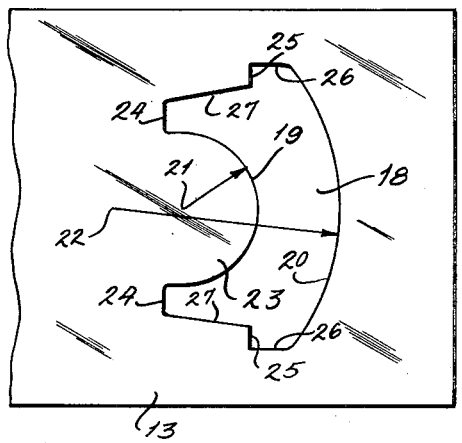
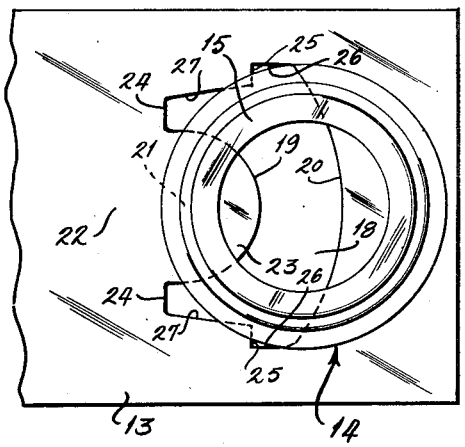
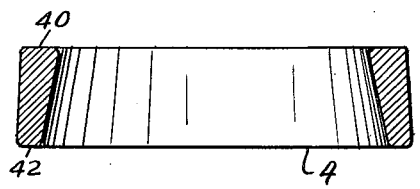
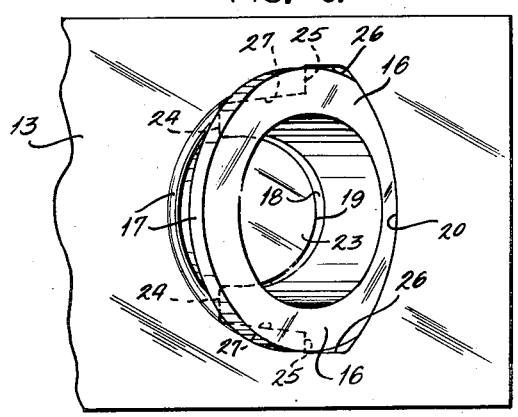
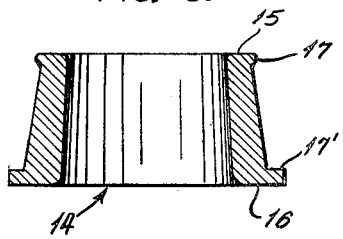

INVENTOR:
John W. Rundt,
By Carr & Carr & Gravely,
HIS ATTORNEYS.

United States Patent Office 2,701,637
Patented Feb. 8, 1955

2,701,637

ARTICLE ORIENTING MACHINE

John W. Rundt, Canton, Ohio, assignor to The Timken Roller Bearing Company, Canton, Ohio, a corporation of Ohio Application November 16, 1949, Serial No. 127,537

7 Claims. (Cl. 209—72)

This device relates to mechanism for turning tubular articles and is more particularly directed to mechanism for orienting such articles in the form of a bored frustum of a cone or having a cylindrical outer surface and a tapered bore.

The object of the invention is to produce mechanism for correctly positioning the cups of anti-friction bearings or other tubular articles in the form of a frustum of a cone or cone-shaped bodies on a conveyor and orienting those not correctly presented to the mechanism before placing the cups or articles on a chute to which they are to be delivered.

The invention consists in the provision of an elongated plate having a slot therein, the outline of which is semi-circular, the base thereof being two diametrical edges acting as fulcrums about which the articles orient when not correctly positioned on the plate, the radii of the ends of the slot being of different length and drawn about centers displaced along the longitudinal axis of the plate, permitting work pieces that are correctly positioned to pass over the slot and turning those about the fulcrums on an axis perpendicular to the longitudinal axis of the articles.

Figure 1:
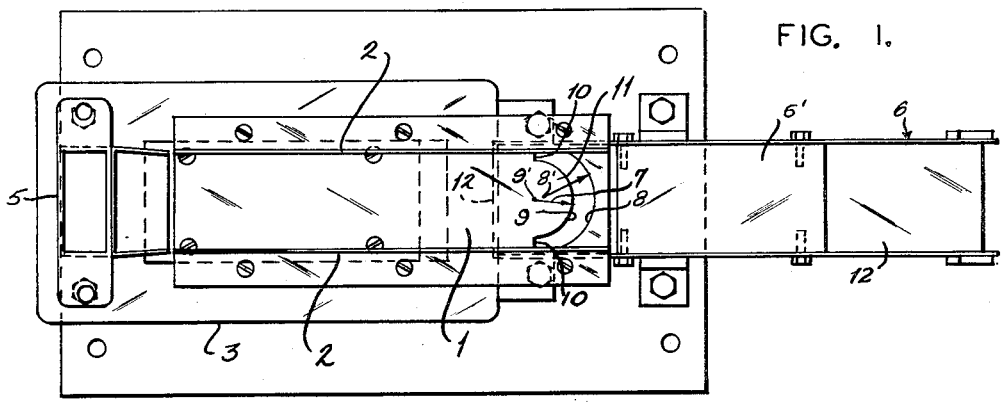
Fig. 1 is a plan view of a device embodying the invention.
Figure 2:
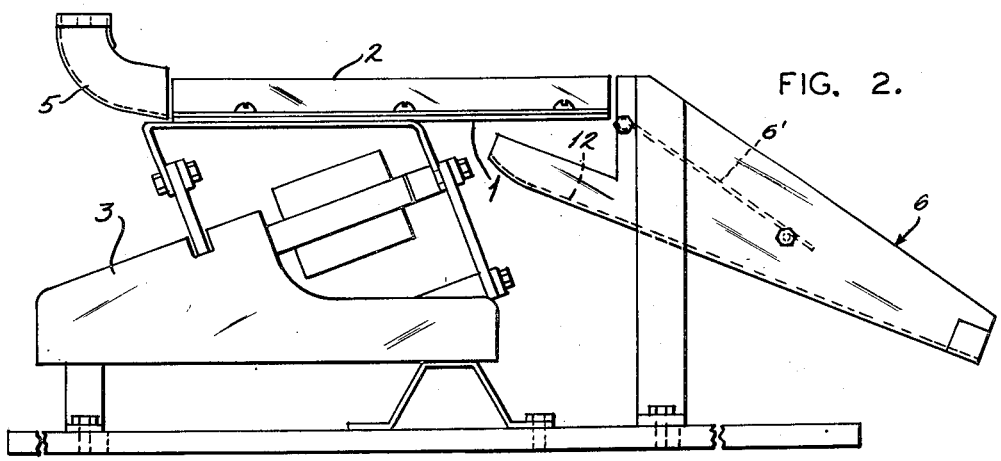
Fig. 2 is a side elevational view thereof.
Figure 3:
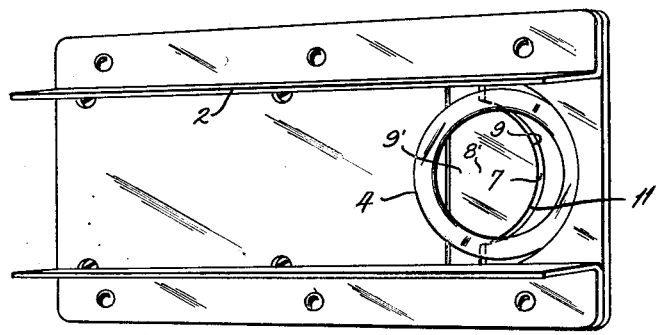

Fig. 3 is a perspective view of a part of the device shown in Fig. 1 with a work piece in the aperture, Fig. 4 is a plane view of a different form of the device, Fig. 5 is a view similar to Fig. 4 but with a tubular body in one orientation thereon, Fig. 6 is a view similar to Fig. 4 with a tubular body in a different oriented position thereon, Fig. 7 is a sectional view of an antifriction bearing cup; and Fig. 8 is a sectional view of an antifriction bearing cone.

One embodiment of the device is illustrated in the drawings in which the numeral 1 designates an elongated turning plate having guide members 2 mounted on either side thereof. The plate is installed in a conveyor system and in line therewith. The plate 1 is suitably supported on a vibrating mechanism 3 for facilitating movement of the tubular articles 4, preferably bearing cups such as shown in Fig. 7, over the plate 1 between the guide members 2 which are spaced to cause the bearing cups to move across the turning plate in single file. The tubular articles are received from a chute 5 which discharges them onto the plate 1. After being processed, the tubular articles enter a two-level chute 6 which has an upper level 6' and a lower level 12 and which is suitably supported at the discharge end of plate 1. After leaving the chute 6, the tubular articles enter another conveyor that feeds them into a machine for a processing operation. The machine into which the bearing cups are fed must receive them in a predetermined position. Some of the cups passing onto the turning plate 1 will not be in that position and must, therefore, be oriented. This orientation occurs by turning them through 180° on an axis perpendicular to the axis of the bore therein.

The tubular articles are in the form of a cylinder having a conical or tapered bore therein so that one end of the cylinder has a face larger than the other, the larger end being referred to as the back face 40 (Fig. 7) and the smaller end as the front face 42. The outside diameters of the front and back faces are the same but the inside diameter of the back face 40 is smaller than the inside diameter of the front face 42.

The orienting means comprises a semi-circular shaped slot 7 which is contained in the turning plate 1 adjacent the outlet end thereof.

The outer edge 8 of the slot 7 is formed on a radius swung from the point 8' and the diameter thereof is slightly larger than the common outside diameter of the front and back faces 42 and 40.

The inner edge 9, which is swung from a center 9' offset from the center 8', is larger in diameter than the inside diameter of the back face 40 but is smaller in diameter than the inside diameter of the front face 42.

The ends of the slot 7 constitute fulcrums 10 about which the bearing cups pivot as they pass therethrough.

The centers 8' and 9' are spaced apart to accommodate the thickness of the bearing cups and to permit them to pass through the slot 7 at an angle, as will be more fully described hereinafter.

The two fulcrums 10 and the edge 9 form a tongue 11 which provides support for the tubular articles that are correctly delivered, front face up, to the plate so that they may pass thereover and drop directly onto the upper level 6' of the chute 6.

If the tubular articles 4 are delivered to plate 1 with the large or back face 40 pointing upwardly, they will drop through the semi-circular slot 7 in plate 1 and as they pass therethrough they will be re-oriented by turning 180° about fulcrums 10 over tongue 11 onto the lower level 12 of the chute 6, the tubular articles turning on an axis perpendicular to the axis of the bore therein. The lower level 12 of the chute 6 is disposed below the plate 1 the proper distance to cause the bearing cups to turn no more than 180°. The solenoid type vibrator 3 facilitates movement of the cups over plate 1 whether or not the tubular articles are turned.

Figs. 4, 5 and 6 illustrate a modified form of the invention which comprises a plate 13 that is substituted for plate 1. This plate controls the orientation of the tubular article or cone 14 for the antifriction bearing which article or cone is provided with a front face 15 and a back face 16, shown more particularly in Fig. 8, and having antifriction members or rollers retaining means 17 and 17' thereon. The cones 14 are presented to the plate 13 with either of the faces 15 or 16 pointing upwardly, but they must be presented to the machine into which chute 6 discharges them with the front face 15 pointing upwardly. A suitable arcuate slot 18 is cut in the plate that will orient the cones not having their front faces pointing upwardly, the slot being cut near the discharge end of the plate.

The slot 18 has two circular edges 19 and 20 whose radii are swung about centers 21 and 22, respectively. These centers are displaced from each other along the longitudinal axis of the plate. A tongue 23 is formed by the edge 19 atnd projects toward edge 20. The fulcrums 24 of the slot are located at diametrically opposite sides of the tongue. The side edges of the slot, i. e. the edges 25, 26 and 27 are shaped to conform to the outer contour of the cone profile. The distance between the edges 25 is slightly greater than the outside diameter of the back face 16, and the distance between the side edges 27 adjacent the fulcrums 24 is greater than the outside diameter of the front face 15 but less than the outside diameter of the back face 16. Also, the width of tongue 19 adjacent fulcrums 24 is less than the inside diameter of the cone.

A bearing cone presented with the front face 15 pointing upwardly on plate 13 will pass over the slot, as indicated in Fig. 5. The shoulders 25 and tongue 23 will prevent the cone dropping through the slot 18, discharging it into the upper level 6' of the chute 6. A cone presented to plate 13 with the back face pointing upwardly, will enter slot 18 with the inner retaining member 17 resting on fulcrum 24. The forward part of the cone passes through the slot with the tongue entering the bore, thus causing the cone or tubular article to be oriented end for end.

The outer surface of cup 4 is frequently made slightly conical in form with the bore thereof being tapered. The bore of cone 14 is freqeuntly tapered, but these constructions will in no way prevent plates 1 and 13 performing their intended function. It is merely required that the slot through which the pieces drop be shaped both on the near side and on the far side to allow the narrow face to enter but to support the wide face. Also, the shape of the slot has to be such as to allow passage of the irregularly shaped cone as it tips over and passes therethrough.

What I claim is:

1. An orienting device, comprising a turning plate having an inlet end and an outlet end for receiving tubular articles having opposed faces of unequal size, the articles being disposed thereon in one of two possible positions with either one or the other of the faces uppermost; an arcuate slot in the turning plate shaped so that the articles in one position will pass over it and articles in the other position will pass therethrough, the slot including means for causing the articles passing therethrough to be pivoted about an axis perpendicular to the longitudinal axis of the articles; and a two-level discharge chute disposed adjacent the outlet end of the turning plate, the upper level receiving the articles which pass over the slot and the lower level receiving the articles which pass through the slot, the lower level being disposed below the slot a predetermined distance whereby an article passing therethrough can turn no more than about 180° before contacting the lower level.

2. An orienting device, comprising a turning plate having an inlet end and an outlet end for receiving tubular articles having opposed faces of unequal size, the articles being disposed thereon in one of two possible positions with either one or the other of the faces uppermost; an arcuate slot in the turning plate shaped so that the articles in one position will pass over it and articles in the other position will pass therethrough, the slot including means for causing the articles passing therethrough to be pivoted about an axis perpendicular to the longitudinal axis of the articles; a discharge chute having an inlet end and an outlet end positioned adjacent the outlet end of the plate and including a bottom wall and an upper wall, both the bottom wall and the upper wall extending downwardly and away from the outlet end of the turning plate, the upper wall terminating short of the outlet end of the discharge chute and being adapted to receive the articles which pass over the slot and discharge them onto the bottom wall of the chute in the same position as received, one end of the bottom wall being disposed below the slot to receive the articles which pass therethrough.

3. An orienting device, comprising a turning plate having an inlet end and an outlet end for receiving tubular articles having opposed faces of unequal size, the articles being disposed thereon in one of two possible positions with either one or the other of the faces uppermost; an arcuate slot in the turning plate shaped so that the articles in one position will pass over it and articles in the other position will pass therethrough, the slot including means for causing the articles passing therethrough to be pivoted about an axis perpendicular to the longitudinal axis of the articles; a discharge chute having an inlet end and an outlet end positioned adjacent the outlet end of the plate and including a bottom wall and an upper wall, both the bottom wall and the upper wall extending downwardly and away from the outlet end of the turning plate, the upper wall terminating short of the outlet end of the discharge chute and being adapted to receive the articles which pass over the slot and discharge them onto the bottom wall of the chute in the same position as received, one end of the bottom wall being disposed below the slot to receive the articles which pass therethrough, the bottom wall being disposed below the slot a predetermined distance whereby an article passing therethrough can turn no more than about 180° before contacting the bottom wall.

4. A device for orienting tubular articles having opposed front and back faces in which the back face is larger than the front face, comprising a plate for receiving the articles in single file with either the front or back face uppermost, and a slot in the plate adjacent one end thereof and including an arcuate inner edge and an arcuate outer edge, the width of the outer edge being greater than the maximum outside diameter of the tubular article, and the width of the inner edge being greater than the inside diameter of the back face but less than the inside diameter of the front face.

5. A device for orienting tubular articles having opposed front and back faces in which the back face is larger than the front face, comprising a plate for receiving the articles in single file with either the front or back face uppermost, and a slot in the plate adjacent one end thereof formed by two arcuate cuts, which provide an inner edge and an outer edge the radii of which are of unequal length and are drawn about centers displaced along the longitudinal axis of the plate, the width of the outer edge being greater than the maximum outside diameter of the tubular article, and the width of the inner edge being greater than the inside diameter of the back face but less than the inside diameter of the front face.

6. A device for orienting tubular articles having opposed front and back faces in which the back face is larger than the front face, comprising a plate for receiving the articles in single file with either the front or back face uppermost, and a slot in the plate adjacent one end thereof and including a substantially semi-circular outer edge and a substantially semi-circular inner edge joined by fulcrum edges which extend transversely of the longitudinal axis of the plate, the diameter of the outer edge being greater than the maximum outside diameter of the tubular article, and the diameter of the inner edge being greater than the inside diameter of the back face but less than the inside diameter of the front face.

7. A device for orienting tubular articles having opposed front and back faces in which the back face is larger than the front face, comprising a plate for receiving the articles in single file with either the front or back face uppermost, a slot in the plate adjacent one end thereof and including a substantially semi-circular outer edge and a substantially semi-circular inner edge joined by fulcrum edges which extend transversely of the longitudinal axis of the plate, the diameter of the outer edge being greater than the maximum outside diameter of the tubular article, and the diameter of the inner edge being greater than the inside diameter of the back face but less than the inside diameter of the front face whereby an article with its front face uppermost will pass over the slot and one with its back face uppermost will pass through the slot and pivot about said fulcrum edges; and a discharge chute having a bottom wall disposed under the slot and spaced therefrom a predetermined distance whereby an article passing therethrough can turn no more than about 180° before contacting said bottom wall.

References Cited in the file of this patent

UNITED STATES PATENTS

| | | |
|---|---|---|
| 295,705 | Williams | Mar. 25, 1884 |
| 635,588 | Pondorf | Oct. 24, 1899 |
| 755,920 | Olin | Mar. 29, 1904 |
| 1,118,972 | Torres | Dec. 1, 1914 |
| 1,237,315 | Eby | Aug. 21, 1917 |
| 1,242,086 | Henriquez | Oct. 2, 1917 |
| 1,456,216 | Brightman | May 22, 1923 |
| 1,533,523 | Thoma | Apr. 14, 1925 |
| 1,784,010 | Johnson | Dec. 9, 1930 |
| 1,908,855 | Makenny | May 16, 1933 |
| 1,967,228 | Drevitson | July 24, 1934 |
| 2,170,567 | Meier | Aug. 22, 1939 |
| 2,215,338 | Sloane | Sept. 17, 1940 |
| 2,346,549 | Belada | Apr. 11, 1944 |
| 2,369,785 | Kuehlman | Feb. 20, 1945 |
| 2,529,603 | Galt | Nov. 14, 1950 |

FOREIGN PATENTS

| | | |
|---|---|---|
| 16,848 | Great Britain | of 1915 |
| 50,314 | Denmark | May 27, 1935 |
| 52,275 | Sweden | Apr. 19, 1917 |
| 349,041 | Great Britain | June 12, 1929 |